(12) United States Patent
Hare (10) Patent No.: US 6,292,909 B1
(45) Date of Patent: Sep. 18, 2001

(54) APPARATUS FOR TESTING COMMUNICATION EQUIPMENT

(76) Inventor: Duncan Hare, 9782 Garrett Cir., Huntington Beach, CA (US) 92646

( * ) Notice: Subject to any disclaimer, the term of this patent is extended or adjusted under 35 U.S.C. 154(b) by 0 days.

(21) Appl. No.: 09/115,066

(22) Filed: Jul. 14, 1998

Related U.S. Application Data (60) Provisional application No. 60/052,430, filed on Jul. 14, 1997.

(51) Int. Cl.[7] .................................... H02H 8/05
(52) U.S. Cl. ............................ 714/40; 379/10
(58) Field of Search .................. 714/40; 379/29, 379/10, 88.18; 370/242; 455/426, 427

(56) References Cited

U.S. PATENT DOCUMENTS

| | | | |
|---|---|---|---|
| 5,572,570 | 11/1996 | Kuenzig | 379/1 |
| 5,737,518 * | 4/1998 | Grover et al. | 714/38 |
| 5,835,565 | 11/1998 | Smith et al. | 379/5 |
| 6,052,371 * | 4/2000 | Lemieux | 370/395 |

OTHER PUBLICATIONS

HP Openview Network Node Manager for the WIndows NT® Operating System Product Brief, Hewlett Packard, International Data Corporation, Mar. 1996, pgs 1–6.

itSMF Newsletter Issue No. 32—Aug. 1998.

* cited by examiner

Primary Examiner—Robert Beausoleil
Assistant Examiner—Rita A. Ziemer
(74) Attorney, Agent, or Firm—Howison, Chauza, Thoma, Handley & Arnott, L.L.P.; Roger N. Chauza, Esq.

(57) ABSTRACT

Apparatus for monitoring and testing a transaction system, and controlled by enterprise automation equipment. The testing apparatus is programmed with various MIB structures to provide probe points and signals to the transaction system. Responses are received by the test apparatus via check points connected to the transaction system. The test apparatus applies test signals to the probe points in a manner similar to signals applied by users of the transaction system. The responses received from the transaction system are again similar to the responses received by the user in the normal utilization of the transaction system.

5 Claims, 5 Drawing Sheets

APPARATUS FOR TESTING COMMUNICATION EQUIPMENT

RELATED APPLICATION

This application claims the benefit of prior-filed copending U.S. Provisional Application No. 60/052,430 filed Jul. 14, 1997, the disclosure of which is incorporated herein.

TECHNICAL FIELD OF THE INVENTION

The present invention relates in general to testing apparatus, and more particular to apparatus and methods for testing the operability of transaction systems to find errors and faults, as experienced by customers and users of the systems.

BACKGROUND OF THE INVENTION

The networking of computers and the computerized equipment has lead to substantial enhancements in the accessibility and distribution of data and information. The networking of equipment can be accomplished by local area networks, wide area networks and other types of communication systems, such as the public switched telephone network (PSTN). While the integration of geographically remote equipment is substantially facilitated by networks of various types, the failures in such networks can and systems have substantial and wide-spread ramifications. Indeed, the troubleshooting of networked systems becomes more troublesome and complicated. There exist test operations and methods that can carry out periodic tests on a network system and report failures. In many instances, the test circuits are driven by software embedded in the application program. While this may be effective, a failure of the application system often results in the inability to report failures. As a result, the customers or users are the first to experience inoperability of the system, rather than a repair or technical staff.

From the foregoing, it can be seen that a need exists for a technique to carry out test on transaction equipment in a manner substantially the same as the procedures utilized by a customer or user. Another need exists for a procedure to test the equipment in the manner utilized by customers so that an accurate portray of the fault can be experienced by the test operation. Another need exists for a test technique for finding faults in the equipment before customers, thereby reducing customer dissatisfaction with the system. Another need exists for a test method for carrying out tests on systems at periodic time intervals to verify the operability of the system.

SUMMARY OF THE INVENTION

In accordance with the principles and concepts of the invention, the shortcomings and disadvantages of the prior art systems have been overcome. According to the preferred embodiment of the invention, the test system accesses a transaction-type system in a manner much like the users thereof. The responses of the transaction system are much like those received by the users of the system. Based on the test conducted, and the response thereto, it can be determined if the system is functional, and if not, which subsystem is at fault. The invention is integrated with conventional test systems so that the test can be carried out periodically, and malfunctions reported quickly to the appropriate technical staff or repair persons.

In accordance with an important feature of the invention, a traffic driver/checker is provided with probe points connected to the various subsystems and components of the system. In addition, the traffic driver/checker includes check points connected to various other equipment of the system to be monitored and tested to obtain inputs in response to tests carried out. The traffic driver/checker is programmed with a Management Information Base (MIB) that controls the flow of tests on the transaction system. The traffic driver/checker operates in conjunction with a conventional enterprise automation package to perform the surveillance, monitoring and testing of the transaction system.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts, elements or functions throughout the views, and in which.

DETAILED DESCRIPTION OF THE INVENTION

Figure 1:
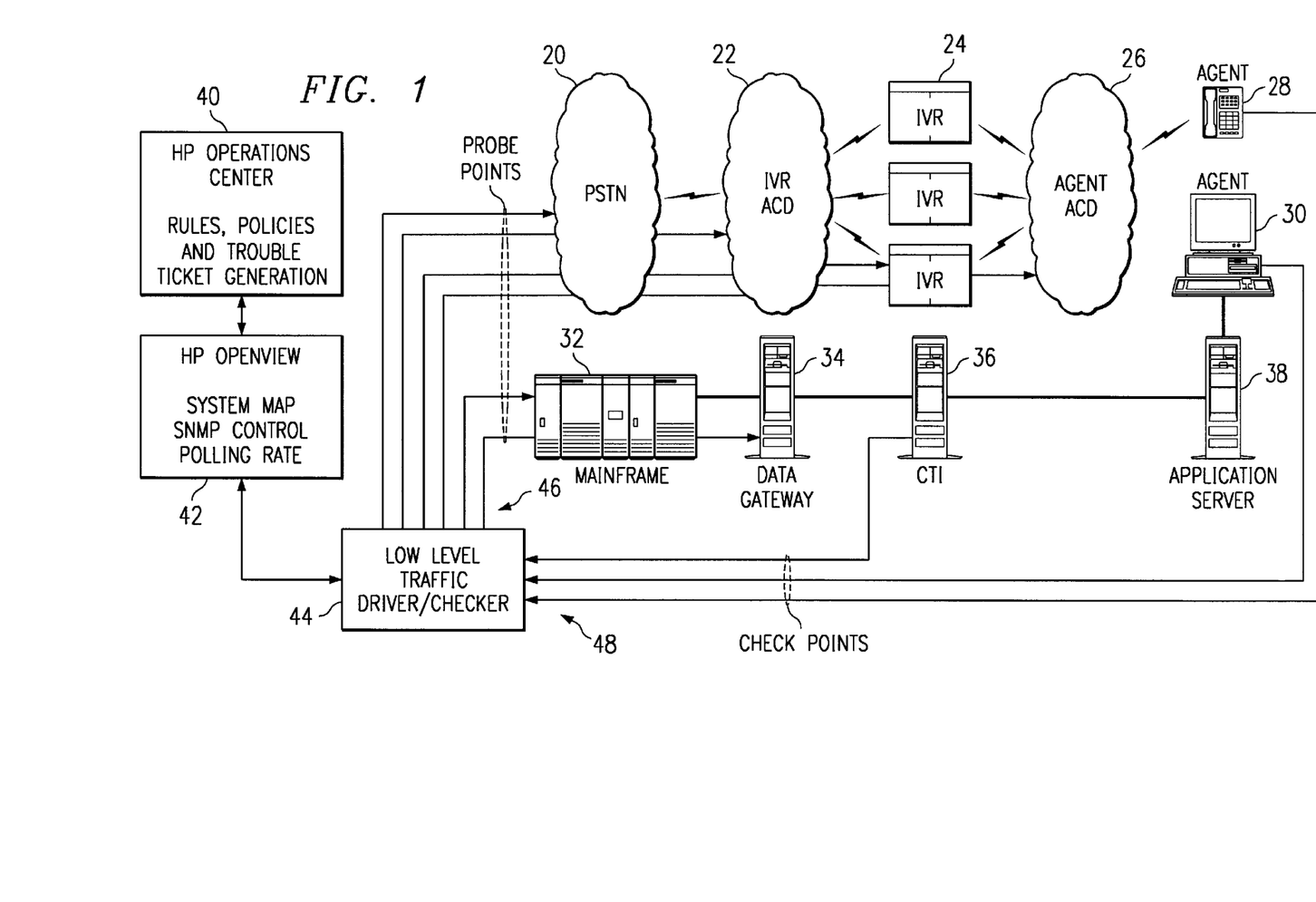
FIG. 1 is a block diagram illustrating the environment in which the invention can be advantageously practiced.

FIG. 1 illustrates a block diagram of the environment in which the preferred embodiment of the invention is adapted for operation. The invention is well adapted for use with transaction systems, such as automatic call distributors (ACDs). Conventional ACD equipment is accessed through the public switched telephone network (PSTN) 20. The PSTN 20 is coupled to an interactive voice response ACD unit 22 by way of telephone lines. The IVR ACD 22 is, in turn, coupled to one or more interactive voice response units that contain the IVR call flow sequences, one shown as reference 24. The IVR call flow retrieves data from legacy systems, associates data to the individual calls, and transfers calls to agent ACD queues. The IVR units 24 can be conventional Unix systems programmed to provide various types of voice responses. The IVR units 24 are coupled to an agent ACD system 26. The agent ACD system 26 is coupled to and delivers queued calls to plural agent telephone sets, one shown as reference 28. As is common, an agent or operator working with the telephone set 28 also has available a terminal or other computer-type equipment 30. As the agent is discussing with the calling party on the telephone set 28, the terminal 30 can be utilized to call up data related to the calling customer. A database concerning matters related to the various calling customers is stored in a mainframe computer 32. The mainframe computer is coupled to a computer telephony integration (CTI) unit 36 via a data gateway 34. The CTI provides screen displays or pops to the terminals 30. The CTI unit 36 is coupled to an application server 38 which, in turn, is coupled to the agent terminal 30.

The overall ACD system functions to receive incoming calls and distribute the calls to the various agent positions that are not then busy. The agents can then verbally discuss matters with the calling customer, call up data concerning the customer, and provide human assistance. As can be appreciated, the monitoring and testing of the system for operability is important so that any faults are detected early and repaired such that the system functions optimally. While the preferred embodiment is described in conjunction with an ACD system, other transaction systems, such as legacy systems, and other systems, are applicable to use by the invention.

In order to provide surveillance and monitoring for the ACD system, the invention employs conventional equipment adapted for managing local area networks. In the preferred embodiment, utilized in conjunction with the invention is an enterprise automatic package, such as the Hewlett-Packard IT operations center equipment 40. The operations center 40 is programmed therein the rules, policies and instructions for generating trouble tickets concerning any malfunctions of the system to be monitored. In addition, the operations center 40 functions in conjunction with Hewlett-Packard openview equipment, identified by reference 42. The openview equipment 42 includes a system map for providing SNMP control and a polling rate for carrying out tests.

In accordance with an important feature of the invention, provided is a traffic driver/checker 44 that includes plural output checkpoints 48 coupled to the system to be monitored and tested. The driver/checker 44 includes an SNMP proxy agent that operates under the control of the open view equipment 42, through a system MIB. The traffic driver/checker 44 can communicate with the openview equipment 42 by way of the Internet. In addition, the traffic driver/checker 44 includes a number of output probe points 46 connected to the various sub-systems of the ACD system. The open view equipment 42 continually polls the ACD system through the traffic driver/checker 44. Both the directory numbers of the PSTN 20 and the IVR individual numbers are polled. When a failure is detected, the operations center 40 probes the system, via the traffic driver/checker 44, to determine which component or sub-system failed. When the failed component is identified by the rules programmed in the operations center 40, a trouble ticket together with an alert is sent to the appropriate office for tracking and repair. The open view equipment 42 provides in a standard manner SNMP mechanisms to control the traffic driver/checker 44. The open view equipment 42 further provides polling control and obtains and sets variables in the driver/checker 44. The operations center 40 contains the policies and control to utilize the probe points 46 provided by the driver/checker 44 to complete surveillance and determine the failing component when outages are detected.

In the preferred form of the invention, the probe points 46 provided by the traffic driver/checker extend as directory numbers to the PSTN 20, as queue directory numbers to the interactive voice response ACD unit 22, as test ports and respective directory numbers to the individual voice response units 24, as queue directory numbers to the agent ACD unit 26, as transactions to the mainframe computer 32 and as a test program on each IVR to the data gateway 34. Various data or information can be input by the traffic driver/checker 44 to the ACD system to determine operability thereof. In the case of the PSTN 20, a telephone number can be dialed to access the ACD system. Responses from the ACD system, in the nature of check points 48 are obtained from the computer telephony integration unit 36, the agent terminal 30 and the agent telephone unit 28. Two mechanisms are utilized for system surveillance of the ACD system. First, polling the system (especially the individual IVRs) and, second, monitoring customer traffic. The first mechanism verifies the correct operation of the IVRs and the CTI components of the system. The second monitor skills requested by the customers, and statistically verifies that calls are routed to the correct agents for the skills requested. The openview equipment 42 continually polls the system through the traffic driver/checker 44. Both the PSTN 20 directory numbers and the IVR individual numbers are polled. When a failure is detected the operations center 40 probes the system to determine which component failed. A failure can be a situation when a call is not completed through the system to a virtual agent. As noted above, when the failed component is identified by the rules programmed in the operations center 40, a trouble ticket and alert notice are dispatched to the appropriate groups for tracking and repair.

In the preferred embodiment, the traffic driver/checker 44 includes a personal computer with a Pentium 166 MHz processor, 128 MB of RAM, 15 megabytes of hard disk drive, Windows NT 4.0, a Dialogic T1 board, and other line interface cards or circuits.

Figure 2:
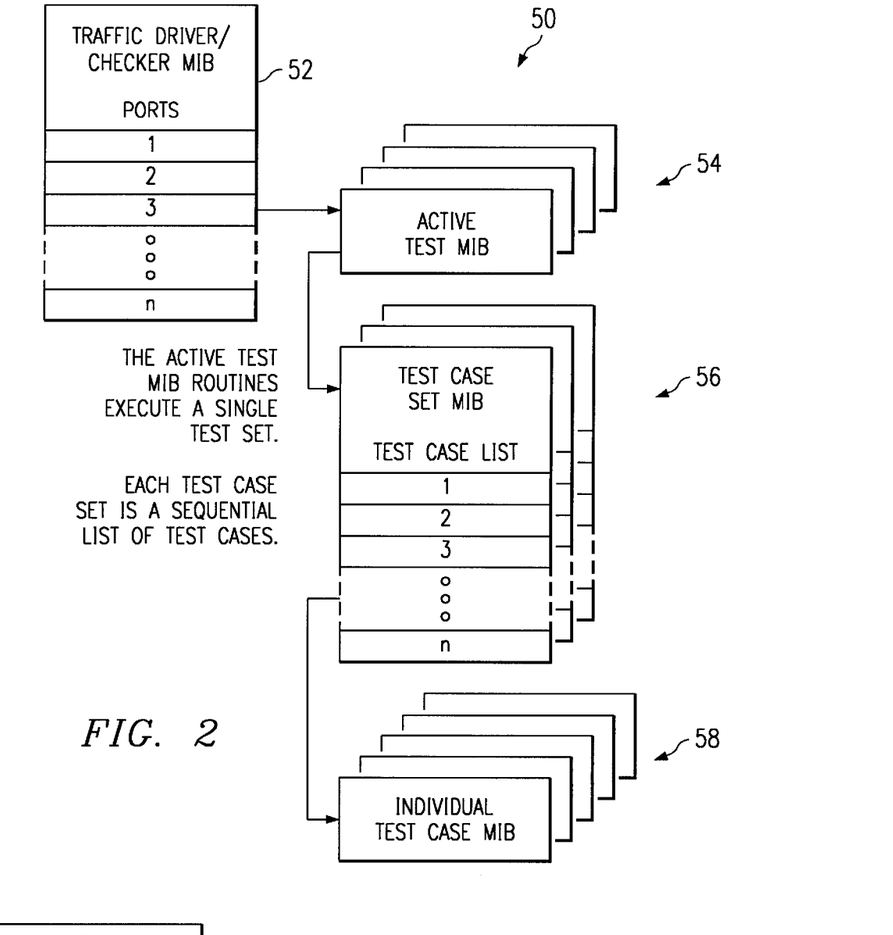
FIG. 2 is the management information base (MIB) structured according to the preferred embodiment of the invention.

FIG. 2 illustrates the MIB structure programmed within the traffic driver/checker 44. The MIB structure 50 includes a traffic driver/check MIB 52, an active test MIB 54, a test case set MIB 56 and an individual test case MIB 58. The traffic driver/checker MIB 52 describes the traffic driver/checker and the voice ports forming a part of the checker 44. Each port section of the traffic driver/checker MIB 52 may contain the object identifier (OID) of the active test set MIB 54 when a test is utilizing the port. The active test set MIB 54 describes and controls active tests carried out to test the ACD system. This MIB is polled by the SNMP manager in order to run tests which monitor the system under surveillance. Each MIB indicates the set of test cases to run as a result of the SNMP manager "get" command.

The test case MIBs 56 describe individual test cases. These MIBs are defined so as to be extensible by the user, either by adding new test case MIBs in associated action routines, or by using an instance of the generic test case MIB that executes any user provided windows MT program as a test case.

The test case MIBs 56 have two sections, namely the test setup and test execution sections. In a set of test cases, all test set up sections of the MIBs are executed before the test execution sections. The test set up sections of the test case MIB is synchronous, meaning that it does not return a "success" value to the "SNMP get" command until the test set up is complete.

The openview equipment 42 communications with the traffic driver/checker 44 by using a system MIB. The system MIB is shown in Tables 1–6 below. The OID of the elements in the MIB is prefixed with the notation 1.3.6.1.4.1.[999], where the following relationship exists:

1 equals ISO
3 equals ORG
6 equals DOD
1 equals Internet
4 equal private
[999] equals the business controlling the testing apparatus
1 equals the traffic driver/checker MIB 44.

The traffic driver/checker static station of the MIB is set forth below. The OID for each MIB element must be unique. The "n" in the OID enables multiple agents. For example, n equal 1 for the first agent, n equal 2 for the second agent, and so on.

TABLE 1

| MIB Variable | Object ID | Type of data | Number in MIB |
|---|---|---|---|
| Traffic driver/checker info | .[999].1.1 | List | One |
| Port Information, number of entries | .[999].1.1.1 | Number | One |
| Port Information | .[999].1.1.1.n | List | Multiple Ports |
| Port Identifier | .[999].1.1.1.n.1 | Card (Trunk) Number, Channel Number | One Per port |
| Port phone number | .[999].1.1.1.n.2 | Phone Number | Used to match calling event with ringing event. |
| Agent Information | .[999].1.1.2.n | List | One Agent Per Port |
| Agent DN | .[999].1.1.2.n.1 | Phone Number | One per agent |
| Agent Login | .[999].1.1.2.n.2 | Phone Number | One per agent |
| Active Test Set | .[999].1.1.2.n.3 | OID | OID of test running on port. |

The traffic driver/checker test set or dynamic section of the MIB is as follows. In this section of the MIB, the "n" in the OID enables the traffic driver/checker to execute multiple active tests. For example, n equal 1 for the first active test, n equal 2 for the second active test, and so on.

TABLE 2

| MIB Variable | Object ID | Type of data | Number in MIB |
|---|---|---|---|
| Active Test Set List | .[999].1.3 | Number | Number of test cases |
| Active Test Set | .[999].1.3.n | OID | OID of Test case list for this active test set. |
| Test Set Status | .[999].1.3.n.1 | Enumeration | Active Inactive Complete Broken |
| Test Set Resource Status | .[999].1.3.n.2 | Enumeration | Running Pass Fail |
| Current Active Test Case | .[999].1.3.n.3 | OID | Running-OID of current test case Pass-OID of test case List Fail-OID of first test that failed in test case list. |

In this section of the MIB, the "n" in the OID enables the traffic driver/checker 44 to contain an unlimited number of sequences of test cases. For example, n equal 1 for the first sequence of test cases, n equal 2 for the second sequence of test cases, and so on.

In this section of the MIB, the "m" in the OID enables the traffic driver/checker to execute a sequence of test to complete an active test. For example, m equal 1 for the first test case, m equal 2 for the second test case, and so on.

TABLE 3

| MIB Variable | Object ID | Type of data | Number in MIB |
|---|---|---|---|
| Test case list, number of test case entries | .[999].1.2 | Number | One |
| Test case list, number of test cases in list | .[999].1.2.3.n | Number | One per test list entry |
| OID of test case. | .[999].1.2.3.n.m | OID | OID list of test run to get result. |

The test case section of the MIB is as follows. In this section of the MIB, the "n" in the OID gives each test a unique OID. For example, n equal 1 for the first test case in a section, n equal 2 for the second test case in a section, and so on.

The generic test case section of the MIB is illustrated below. This shows the test case set up, test case execution structure to the test case.

TABLE 4

| MIB Variable | OID | Type of data | Number in MIB |
|---|---|---|---|
| Generic Test Cases | .[999].1.4 | | |
| Test Case List | .[999].1.4.1 | Number | One |
| Test Case Name | .[999].1.4.1.n | Name | One per test case |
| Test Case Set Up | .[999].1.4.1.n.1 | Name | One List Per Test Case |
| Test Case Set up | .[999].1.4.1.n.1.m | String | Multiple per test case |
| Test Case Execution | .[999].1.4.2.n.2 | Name | One List Per Test Case |
| Test Case Execution | .[999].1.4.1.n.2.m | String | Multiple per test case |

For the test case set up and execution, the "string" is a command line, with input fields, that executes a windows MT program.

The voice test case section of the MIB is as follows. Expected DNs called are:

a) call sender, b) input ACD queue, c) individual IVR, and d) agent ACD queue.

Table 5 below illustrates some generic voice test cases.

TABLE 5

| MIB Variable | OID | Type of data | Number in MIB |
|---|---|---|---|
| Voice Test cases | .[999].1.5 | | |
| Test Case Type DN Call List | .[999].1.5.1 | Number | One |
| Test Case Name | .[999].1.5.1.n | String | One per test case |
| Test Case Set Up | .[999].1.5.1.n.1 | | One per test case |
| Expect IVR Greeting | .[999].1.5.1.n.1.1 | Voice Prompt | One per test case |
| Test Case Execution | .[999].1.5.2.n.2 | | One per test case |
| Call Center DN | .[999].1.5.1.n.2.1 | Phone Number | One per test case |
| Expected Average Speed of Answer (Input) | .[999].1.5.1.n.2.3 | Time (seconds) | One per test case |
| Expected Variance Speed of Answer (Input) | .[999].1.5.1.n.2.4 | Time (seconds) | One per test case |

TABLE 5-continued

| MIB Variable | OID | Type of data | Number in MIB |
|---|---|---|---|
| Actual Average (Measured)r | .[999].1.5.1.n.2.5 | Time (seconds) | One per test case |
| Actual Variance (Measured) | .[999].1.5.1.n.2.6 | Time (seconds) | One per test case |
| Test Case IVR Response List | .[999].1.5.2 | Number | One |
| Test Case Name | .[999].1.5.2.n | Name | One per test case |
| Test Case Set Up | .[999].1.5.2.n.1 | | One per test case |
| Expect IVR Prompt | .[999].1.5.2.n.1 | Voice Prompt | One per test case |
| Test Case Execution | .[999].1.5.2.n.2 | | One per test case |
| IVR Input String | .[999].1.5.2.n.2.1 | String of Digits | One per test case |

Table 6 shows an MIB for an agent call. This MIB provides information to test a case where an IVR input string results in a call to an agent and some data function, such as a screen pop, in addition to the call.

TABLE 6

| Test Case IVR Transfer | .[999].1.5.3 | Number | One |
|---|---|---|---|
| Test Case Name | .[999].1.5.3.n | Name | One per test case |
| Test Case Set Up | .[999].1.5.3.n.1 | | One per test case |
| Expect Agent Call | .[999].1.5.2.n.1.1 | Answer | One per test case |
| Expected Data Type | .[999].1.5.2.n.1.2 | Enumeration 1-None 2-Genesys 3-URL 4-TBD | One per test case |
| Expected Data | .[999].1.5.2.n.1.3 | String | One per test case |
| Test Case Execution | .[999].1.5.3.n.2 | | One per test case |
| IVR Input String | .[999].1.5.3.n.2.1 | String of Digits | One per test case |

The transaction section of the MIB is set forth below in Table 7.

TABLE 7

| MIB Variable | OID | Type of data | Number in MIB |
|---|---|---|---|
| Transaction Test Case | .[999].1.6 | Name | One |
| Data Transaction List | .[999].1.6.1 | Number | One |
| Data Transaction Name | .[999].1.6.n.1 | Name | One Per Transaction |
| Data Transaction Type | .[999].1.6.n.2 | 1 RPC 2 LU6.2 Transaction 3 HTTP (URL) read | One Per Data Returned list entry |
| Transaction Target Destination | .[999].1.6.n.3 | String Target Host/ Machine | One |
| Transaction Input String | .[999].1.6.n.4 | String | One |
| Data Returned Number Output Strings | .[999].1.6.n.5 | Number | Multiple |
| Data Returned Output String Position | .[999].1.6.n.m.1 | Number | One Per Output String |
| Data Returned Output String | .[999].1.6.n.m.2 | String | One Per Output String |

For a more thorough understanding of the utilization of SNMP and MIBs, reference is made to the text TOTAL SNMP: "Exploring The Simple Network Management Protocol", by Sean J. Harnedy, Prentice Hall 1997, ISBN 0-13-6469949; and "Understanding MIBs", by David Perkins, Evan McGinnis, Prentice Hall, ISBN 0-13-437708-7, the disclosures of which are incorporated herein by reference.

To ensure that customers of the ACD system are satisfied with the service level they are receiving, the monitoring system tests the services in the same way that a customer will use the service.

The ACD system is monitored in a 6-step process:

1) Define exactly what services are to be to monitored,
2) List all the components, both hardware and software that are needed to provide the services,
3) List the number of ICONs needed to represent the components on the Graphical Display of the service,
4) Define the points and the components that should be tested,
5) Define the tests that should be run in order to verify that the components are working properly, and
6) Write the test routines using MIBs and test cases which the MIBs will use to verify that the systems are working properly.

These steps are discussed in more detail below.

The first part of the monitoring procedure is a planning process. A list is made of the services that are to be monitored. It may be desirable to monitor only a subset of the overall service package, or all the services can be monitored.

Once the services to be monitored have been listed, it is necessary to identify the steps a customer performs to use the service (dial a certain telephone number, enter password, identification, et cetera). A definition is also needed of what constitutes successful service delivery—who is the customer, and what service is expected.

Next, the various subsystems used in providing each service are identified. Systems interdependencies should be identified as well. Each node should be identified, along with the test cases and each test case's parameters, plus details as to what constitutes a successful test.

By identifying the services and the various system elements that are necessary to provide each service, information is compiled to simulate a customer transaction. What constitutes a passing indication for each subsystem and for the overall service transaction is also identified.

For example, consider a service which provides customers with voice mail when the access number is dialed. To test this service, it is necessary to dial through the telephone network to the voice mail system, and attempt to retrieve a voice mail message. The information required to write the test procedure includes the telephone number to dial, a method of confirming that the telephone was answered, the voice mail mailbox number, the password, and a message stored at the test mailbox. The test case list would include two tests: (1) dialing into the system and (2) message retrieval. If either test fails, subsequent tests are needed. Did the dialup portion of the test fail? Why? Some failures may be line busy, no dial tone, or ringing existed but the distant end failed to answer the call.

Additional tests will be needed to discover why voice mail retrieval failed. Did the system accept the password? If the voice mail system accepted the password, did it fail only once (perhaps due to a bad connection) or did it fail repeatedly (possibly the voice mail program failed, or was the test equipment unable to access the mailbox because the access database table was changed.

A passing indication is obtained when the test equipment dials into the system and successfully retrieves the test voice mail message from the voice mail system.

The probe points 46 may be placed at subsystem boundary points—for example, a gateway, a network access point, or a network transport system. Probe points may also be placed within an application system as the transactions or remote procedure calls (RPCs).

Boundary probe points define the subsystem which has failed. If tests to a particular probe point fail, but network subsystems up to that point have been proven to be working, the problem is likely to be found in the subsystem which failed the test.

Internal probe points define the part of an application or subsystem which has failed. These probe points are useful after a test to a boundary probe point has failed, because they provide additional diagnostic information. As one example, if boundary probe points show a mainframe application gateway is not returning requested information, running a test to an internal probe point could help determine that the problem is not the gateway itself, but rather one or more application end points which are failing to report data received.

Service assurance tests can verify that the systems are delivering the services expected by the customers. Defining these tests requires use of the information already gathered—in particular, the definition of what constitutes a successful customer transaction, and what a customer needs to do in order to obtain the service.

Diagnostic tests are required after a transaction failure has been detected. Using the information identified above, each boundary point is tested to determine which subsystem has failed. If the system is tested in a sequential manner, from beginning to end, the first boundary point which fails the diagnostic test must contain the faulty subsystem.

Once the faulty subsystem has been identified, running tests to various sub-elements within it will identify which parts or components have failed.

The diagnostic rules are applied at the enterprise automation level. For example, if a network data path has failed, it is likely there will be several other tests which fail. The function of the enterprise automation layer is analyze the results of the test, and isolate the most likely causes of the failure.

Consider the example in FIG. 1, where an application on the server 38 has failed. If a sequence of tests is initiated via the PSTN 20, dialing into the IVR 24, all subsystems up to and including the agent position telephone 28 and data screen 30 will pass the test. However, all systems from the application server 38 to the mainframe 32 will fail the tests, because the test requests cannot pass through the failed application on the server 38. The test equipment in conjunction with an enterprise automation package will identify the failed component and facilitate the repair process by eliminating guesswork in identifying the point of failure.

Once a service assurance test sequence shows a system component has failed, the test equipment in conjunction with the enterprise automation equipment begins a series of diagnostic tests to determine exactly where the failure has occurred. The diagnostic rules associated with the enterprise automation equipment determine the source of the trouble.

As an example, suppose that tests have just been completed on the application server 38, and the CTI server 36 has passed its tests. While tests are being performed on the CTI server 36, the application server fails—hence, the CTI tests report a failure. The diagnostic rules then run a series of diagnostic tests to determine the source of the failure, and optionally route a trouble ticket to the appropriate operations group.

As noted above, the traffic driver/checker 44 is designed to work with an SNMP network management system, such as HP OpenView 40. After a fault condition has been identified, the enterprise automation package has the option to follow a predefined rule to issue a trouble ticket to the operations group best able to resolve the problem. When the trouble has been resolved, the technical personnel can clear the ticket. By enforcing a policy requiring the technical staff to clear the ticket with operations personnel, a complete record of the trouble and its resolution becomes available at the management level.

The MIB (Management Information Base) is a primary component of the monitoring system. The MIB allows one to define precisely what tests that are to be run, in which order, and what response is expected from the test. The test equipment will execute the MIB step by step, and will return a pass or a fail condition to the monitoring system, such as HP OpenView 40.

The MIB structure is essentially a collection of linked lists and databases, which provide information about the tests to be run, the order in which they are to run, and the circumstances under which they are to run. The first MIB identifies the test case lists according to ASN1 numeric names by the module name, otherwise also known as object identifiers (OID). Table 8 below shows an assortment of different modules which are contained in the MIB, including several different test cases, lists of test cases to be run, as well as some management modules.

TABLE 8

| m/b Table | O/D | Name | Status | MaxAccess |
|---|---|---|---|---|
| 1 | 1, 3, 6, 1, 4, 1, 2392, 2, 1 | sigGlobalRegModule | | not-accessible |
| 2 | 1, 3, 6, 1, 4, 1, 2392, 2, 2 | sigSystemMibCapModule | | not-accessible |
| 3 | 1, 3, 6, 1, 4, 1, 2392, 2, 3 | systemIntegrationGroupVoicePorth | | not-accessible |
| 4 | 1, 3, 6, 1, 4, 1, 2392, 2, 5 | testCaseLists | | not-accessible |
| 5 | 1, 3, 6, 1, 4, 1, 2392, 2, 6 | voiceCallTestCases | | not-accessible |
| 6 | 1, 3, 6, 1, 4, 1, 2392, 2, 7 | userTestCases | | not-accessible |
| 7 | 1, 3, 6, 1, 4, 1, 2392, 2, 8 | voiceAnswerTestCases | | not-accessible |
| 8 | 1, 3, 6, 1, 4, 1, 2392, 2, 9 | AnswerTestCases | | not-accessible |
| 9 | 1, 3, 6, 1, 4, 1, 2392, 2, 10 | TestCases | | not-accessible |
| 10 | 1, 3, 6, 1, 4, 1, 2392, 2, 11 | MCallFlossTestCases | | not-accessible |
| 11 | 1, 3, 6, 1, 4, 1, 2392, 2, 12 | MPortTestCases | | not-accessible |
| 12 | 1, 3, 6, 1, 4, 1, 2392, 2, 14 | systemintegrationGroupPBXPortMI | | not-accessible |
| 13 | 1, 3, 6, 1, 4, 1, 2392, 3, 4 | testCaseListsCont | | not-accessible |

TABLE 8-continued

| m/b Table | O/D | Name | Status | MaxAccess |
|---|---|---|---|---|
| 14 | 1, 3, 6, 1, 4, 1, 2392, 3, 4, 1 | testCaseListsGroups | | not-accessible |
| 15 | 1, 3, 6, 1, 4, 1, 2392, 3, 4, 1, 1 | nodeNameGroup | current | not-accessible |
| 16 | 1, 3, 6, 1, 4, 1, 2392, 3, 4, 1, 2 | testCaseListsGroup | current | not-accessible |
| 17 | 1, 3, 6, 1, 4, 1, 2392, 3, 4, 1, 3 | testCaseListGroup | current | not-accessible |
| 18 | 1, 3, 6, 1, 4, 1, 2392, 3, 4, 1, 99 | testCaseManagerGroup | current | not-accessible |
| 19 | 1, 3, 6, 1, 4, 1, 2392, 3, 4, 2 | testCaseListsCompis | | not-accessible |

The test equipment provides a "User Test Case table" which is integrated into the MIB structure. Using this user-defined test case table, external programs can be defined and run under conditions set by the user.

The traffic driver/checker 44 has four sets of tables visible to the user.

The four sets of tables are:

1. The Node Table

This contains a list of the node is the system, examples of components are: the PSTN, IVR pool, Call Center Agents in a location, and Mainframe Transactions.

2. The Test Case Lists Table

This is a list (sequence) of test cases. Each test case in the list is to be run before the complete test list is passed. A sequence of test cases will stop on the first failure, or if a test case does not respond within the specified timeout.

A timeout of zero means the test case has no timeout. This is used for long running tests (for example and IVR port monitor), that may report a failure at a later point in time.

3. The Test Case List Table

This contains the run time information for test cases for a specific test list. This includes test case result (pass, fail, or timeout), the test case result (a text string), and the test result information from all previously successful test cases in the test case list.

4. Tables of test cases with similar parameter syntax, but different parameter values.

These are the tables of test cases. These contain the static information used to run a test. Static information includes, telephone number to dial, program to run, and timeout for the test.

Various user-selectable options are available by clicking on areas of the user screen interface of the traffic driver/checker 44, as follows:

Database:
  Initialize
  Expunge
  Promote
  Exit
Testing:
  Components
  Test Cases
Help:
  File—Load
  Testing—Nodes
  Testing—Test Cases
  Test Case Running
  About Service Meter "Initialize" is used to initialize the test system.

"Expunge" deletes system component entries which have been previously marked for deletion.

"Promote" moves the contents of the database from the "test" test apparatus to the production systems.

The "Exit" option terminates the test program.

At the "Testing" menu, one may select either the "Components" section or the "Test Cases" option.

When the program is first started, the only choice under either option is "Load." This loads any existing database entries for either the system component list or the test case list.

Add Node allows the user to add a new test location of the Components section MIB.

Add List permits the addition of a new test case list to the sequence of tests to be run. A new test case list can be added to either a newly added node or to a node which already has test cases defined. Of course, the list may also be added by clicking on the "Add List" menu choice.

Clicking on "Load" loads information from the database for use by traffic driver/checker 44.

"Delete" erases any test case or node which has been previously marked for deletion.

"Undelete" allows restoral of a previously-deleted test node, in case the node was deleted by mistake.

The first three functions have the same uses as previously discussed under "Components," viz. deleting, loading, and undeleting test cases.

The fourth function, "Duplicate," allows the user to copy a previously-defined test case, and make a new test case by changing some of its parameters. An example of this feature would be performing the same series of tests on a different IVR in another city. Duplicating the test case and changing the telephone number to be dialed will create a new test case without the need for re-typing all the other information.

The "HELP" files contain sections useful to the user in operating the traffic driver/checker 44.

Figure 3:
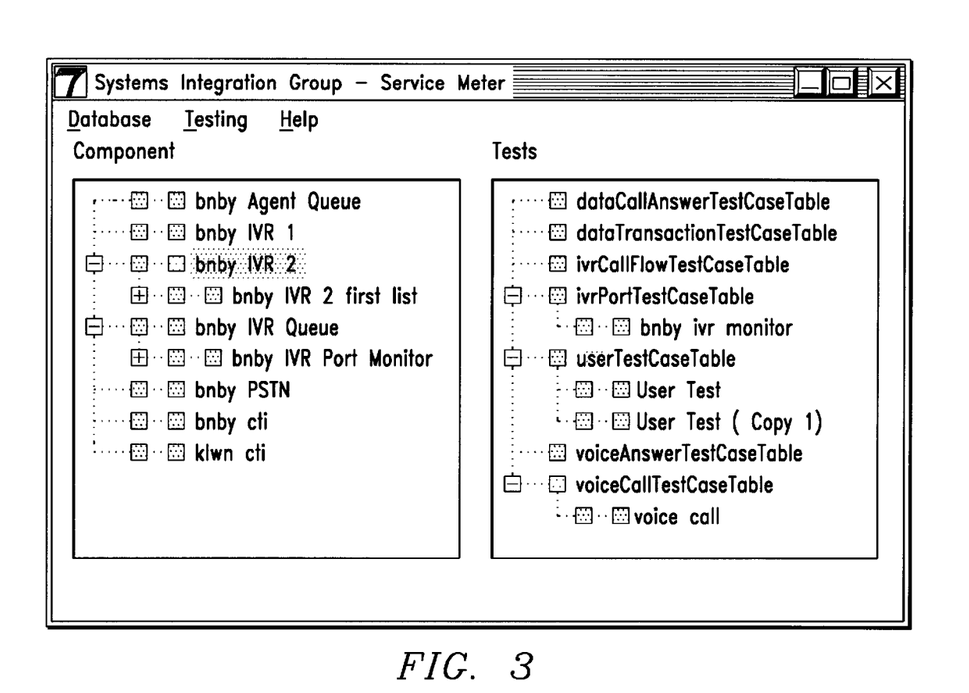
FIG. 3 is a user screen display illustrating the number of areas selectable for use.

FIG. 3 shows the administration screen display which illustrates the description of other clickable areas.

1. An item is shown as selected by a color change of the first image in the item.

2. The test cases in a list can be moved by drag and drop, by clicking and holding the left mouse button on a test case. In the upward direction, the test case inserts before the test case it is dropped on. In the downward direction it inserts after the test case it is dropped on.

3. Clicking on the second colored bitmap invokes the test case editor for the test case. Because there is only one copy of a test case (a row in its test case table), changing the values in the test case editor change the values for this test case in every tree view leaf.

4. The OID of an item is show by clicking with the right mouse button.

5. By clicking on the plus or minus bitmap one can collapse or expand the tree.

Test Cases Tree View

6. Clicking with the left mouse button on the second bitmap in a test case tree view leaf invokes the Test Case Editor. Because there is only one copy of a test case (a row in its test case table) changing the values in the test case editor change the values for this test case in every tree view leaf.

7. Clicking with the right mouse button, or click and holding the left mouse button on the first test case leaf bitmap enables one to drag the test case and drop it into a Test List.

Figure 4:
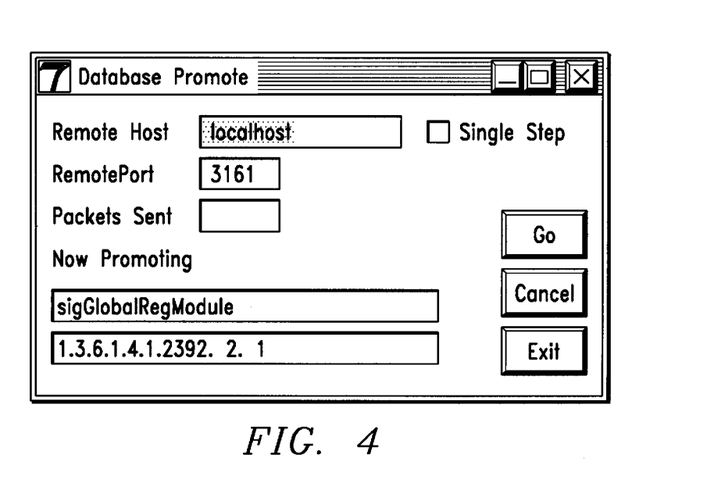
FIG. 4 is a user screen display illustrating a promotion window.

FIG. 4 shows the database promotion screen display. This screen display enables one to change the destination host and port at which the traffic driver/checker 44 is responsive. For correct operation, for example, the traffic driver/checker 44 is responsive on port 161 (the standard SNMP port). In the preferred embodiment, the traffic driver/checker 44 cannot run concurrently with other SNMP application in a single Windows NT machine.

The single step box is useful to trickle promotion traffic to the traffic driver/checker 44. If checked, another button labeled Step is made visible, and clicking on this button promotes the contents of one traffic driver/checker 44 table at a time.

Figure 5:
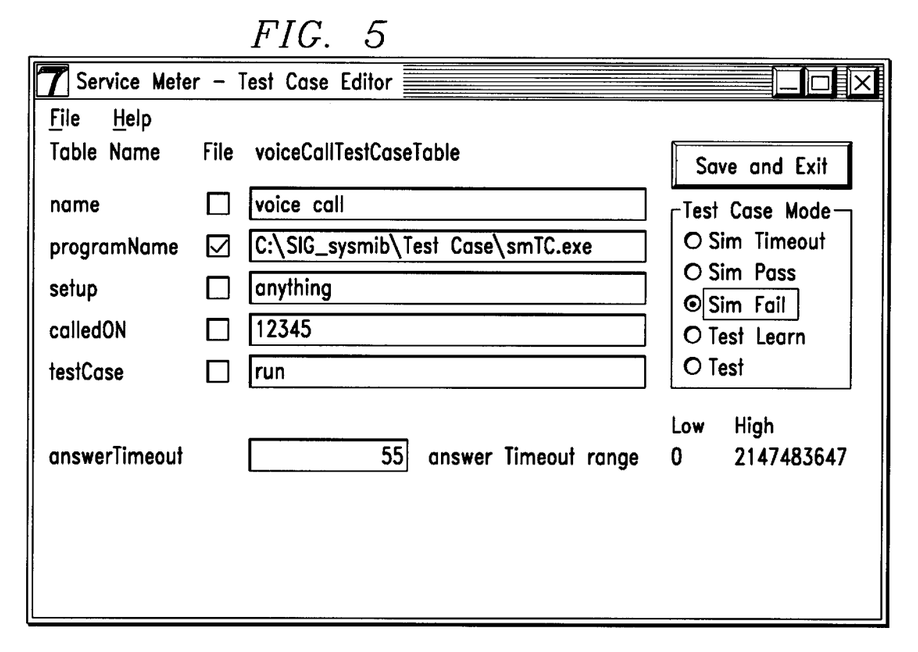
FIG. 5 is a user screen display showing a test case editor.

The test case editor of FIG. 5 shows the parameters for a test case. There are two parameter data types, string and integer. For string data there are two sub types of string, internal which is less than 255 bytes long, and external string types that consists of a file and its associated file name.

The check box next to the string name indicates if the string is internal or external. When clicked to check the box, a browse menu is prompted to select the file name of the file that contains the external string.

For integer data the valid range defined in the MIB is shown. Values outside this range are not allowed.

The box labeled Test Case Mode sets the mode of the test case. Simulation modes are Timeout, Pass and Fail. The Run modes are Learn and Test.

Test Case modes are learn and test. The Learn mode is used when running a test case to discover how it reacts to a know good component. In learn mode the result should be recorded by the test case so that is can determine a pass or fail when running in the test mode. The Test mode is used to run a test case against a component to determine if the component is working.

One special result is possible when running in the test learn, or test mode. This is a fail case, and occurs when the test case event in the test case OCX is unassigned (no entry address). The traffic driver/checker 44 considers this is a test failure, and this result may be attributed to an implementation error.

Figure 6:
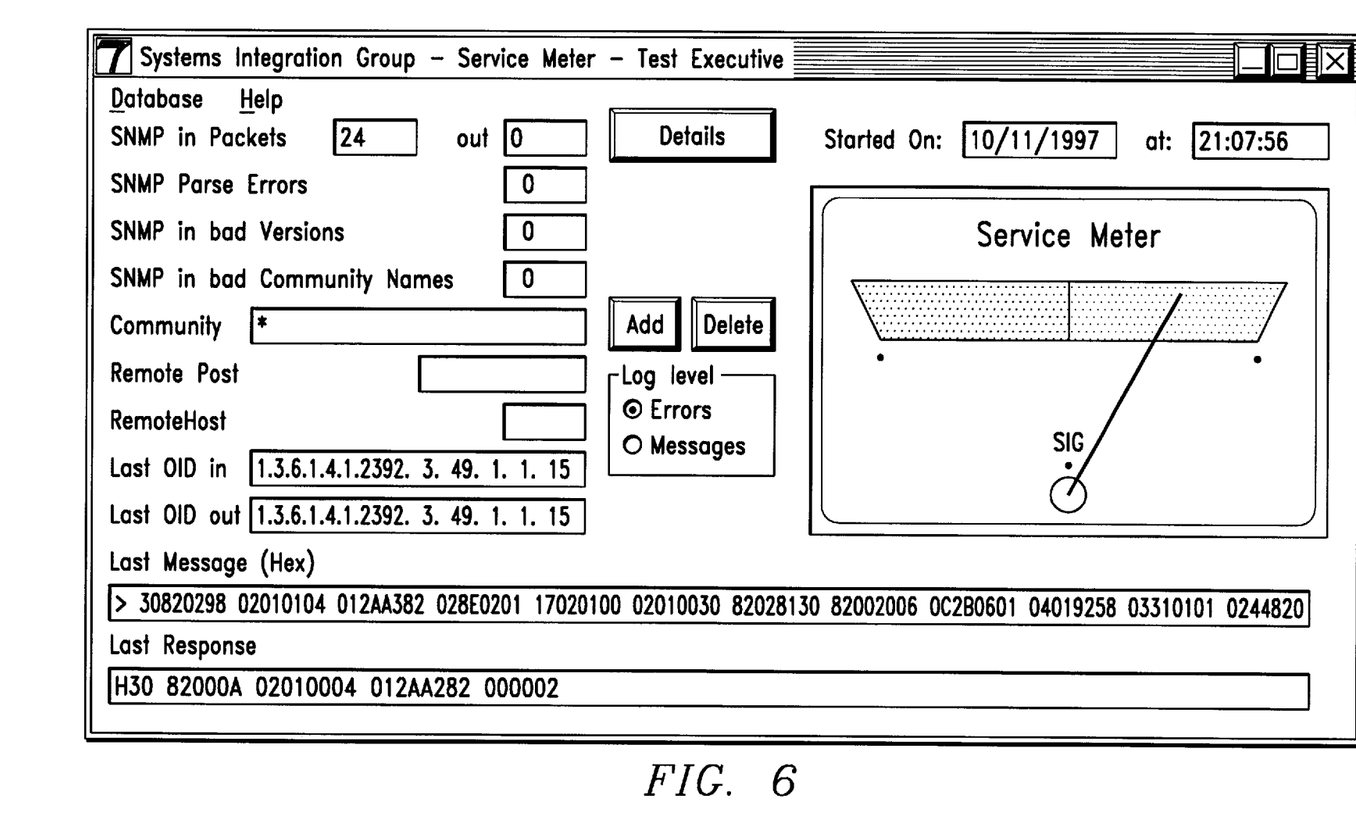
FIG. 6 is a user screen display illustrating a test executive window.

FIG. 6 shows the Test Executive screen display of the traffic driver/checker 44.

On the left side of the screen display are a number of SNMP counters. In normal operation the error counters are preferably at zero.

The community field shows the last community name received. If there is no record of a community name, the SNMP request is not processed. To add a community name, either accept the name in the community field, or type the desired name and press the "add" button. Similarly, one can remove a name with the delete button.

The reminder of the fields show the last OID in and out, and the SNMP data packet. The format of these packets is described in the text "Understanding MIBs" identified above.

In addition to the foregoing information, a log file is prepared. Errors are recorded. All messages can be recorded by selecting the messages button. Log messages are written in either a hex version of SNMP packet format, or for errors, in plain text.

Figure 7:
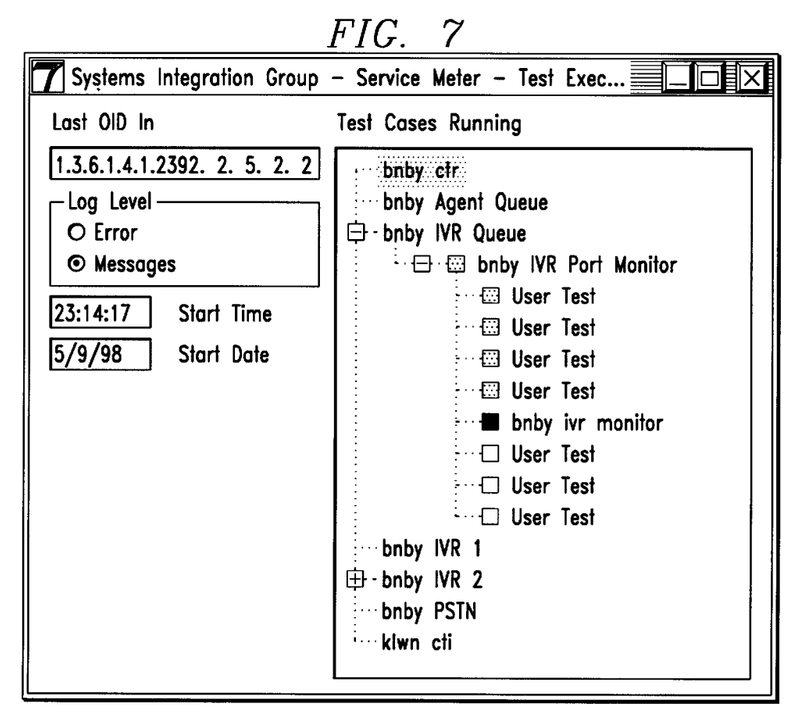
FIG. 7 illustrates a screen display showing a test list with corresponding test results.

FIG. 7 shows the Program Control screen display. This screen display shows a Test List with a test result of "Test Complete: Timeout". The test case with green bitmaps respond with a "pass". The test case with the black bitmap timed out, and Program Control has stopped the test case. The test cases with the yellow bitmap are "ready to run", but cannot run because of the test case timeout. Each test case is a separate windows task that communicates with the program manager through a UDP socket.

One can run a test case list from the Program Control Window. This is accomplished by clicking the right mouse button on the bit map before the Test Case List name. This feature is intended to test the Test Cases without having to poll the traffic driver/checker 44 run time from an SNMP manager.

A test case can be canceled by night clicking on the test case icon in a test Case List. This sends a stop message from program control to the Test Case. If the Test Case does not stop within 30 seconds, Program Control will timeout and destroy the Test Case process.

Test cases are built in the following manner. Before building the test cases for a system, a review of the particular system is needed. The goal for the review is to provide all the information needed to build the test cases. The review is preferably a four-step procedure, as follows:

1) Analyze the services provided to customers. The analysis should clearly identify what constitutes a working system and how the customers determine whether or not the service is working.

2) List the components of the technical systems used in providing the service, and what each system must do to successfully deliver service to the customer. This creates the basis for defining a series of pass/fail tests which will be run using the traffic driver/checker 44.

3) For each system, list how it is known whether the system is working, from the customer's viewpoint. This will define the normal operation for the system.

4) For each system, determine the conditions which characterize whether the system is succeeding or failing in its assigned task. These pass/fail conditions will inform the traffic driver/checker 44 whether or not the system is fulfilling its assigned role in providing service to the customer.

Once the foregoing information has been compiled, building actual test cases becomes a three-step process:

1) Create a MB to define the test process and to tell the traffic driver/checker 44 the order in which tests are to proceed.

2) Create a series of test cases (test case lists) which determine whether the system passes or fails the test. These test cases may include any combination of tests defined for the systems.

3) Create a script which runs a single test, for each aspect of the system which is to be monitored. Collections of these test scripts are used to verify that the systems are operating properly.

Figure 8:
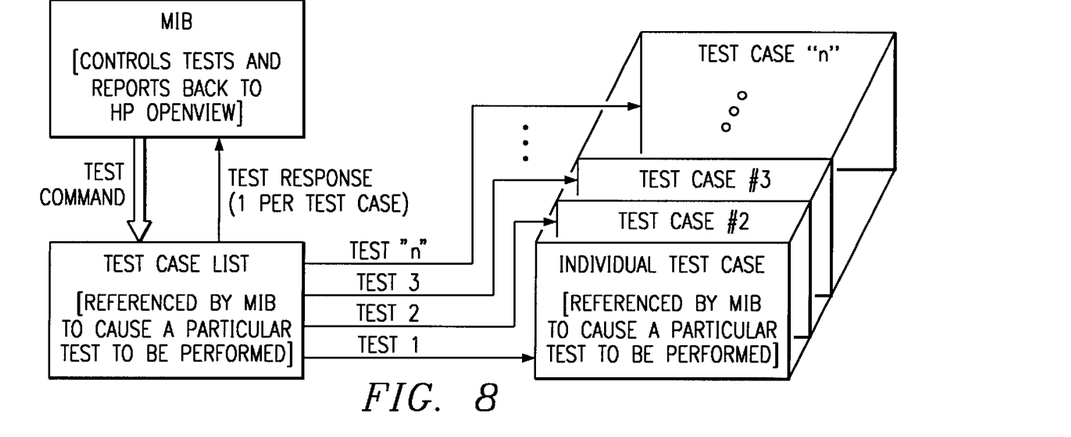
FIG. 8 is a blocked diagram showing the interrelationship between the MIB, the test case list and the individual test cases.

FIG. 8 illustrates the interrelationship between the MIBs, the test case list and the individual test cases.

The following is an example of an MIB. A user of the test equipment can add additional MIBs and test cases.

Each test case (row in the test case table) represents a specific test case. Each test case in a test case table has the same syntax parameter list (each parameter is a column in the test case table). Each test case in the table may have different run time parameters, including the name that the program uses to run the test case.

Each test case table has a unique number, namely a part of the MIB OID that identifies the test case table. In the example below, the unique number is defined by the clause {sigModules 7} in the MODULE-IDENTITY section of the MIB definition.

To build a new test case, the names in this section are changed to the new test case name. (The text identified above and entitled "Understanding MIBs" can be utilized to obtain a explanation of the ASN syntax required to make this change).

```
SIG-USER-TEST-CASES DEFINITIONS ::= BEGIN
    IMPORTS
        MODULE-IDENTITY, OBJECT-TYPE, Integer32
          FROM SNMPv2-SMI
        TEXTUAL-CONVENTION, DisplayString
          FROM SNMPv2-TC
        MODULE-COMPLIANCE, OBJECT-GROUP
          FROM SNMPv2-CONF
        sigGeneric, sigModules
          FROM SYSTEMS-INTEGRATION-GROUP-GLOBAL-REG;
userTestCases                       MODULE-IDENTITY
LAST-UPDATED                        "9705140000Z"
ORGANIZATION                        "Systems Integration Group"
CONTACT-INFO
"           Duncan Hare
                    Postal: Systems Integration Group
                            PO Box 3230
                            Blaine, WA 98231-3230
                            US
                       Tel: +1 604 301 0935
                    E-mail: duncan.hare@iname.com        "
        DESCRIPTION                 "Initial Version of the simulation
MIB, version 1.0"
    ::= { sigModules 7 }
RowStatus       ::= TEXTUAL-CONVENTION
        STATUS                      current
        DESCRIPTION                 "Row status-destroy is not allowed"
        SYNTAX                      INTEGER   { active(1),
                                        notInService(2),
                                        notReady(3),
                                        createAndGo(4),
                                        createAndWait(5),
                                        destroy(6) }
TestCaseMode    ::= TEXTUAL-CONVENTION
        STATUS                      current
        DESCRIPTION                 "Mode of test case list.
                                    If the mode is undefined, the test
case is
                                        skipped.
                                    If the mode is pass, the test is
passed,
                                        with the result set to expected
result.
                                    If the mode is fail, the test is
failed,
                                        with result left as set by the
system
                                        administrator.
                                    If mode is set to learn, all the
test case
                                        runs and set the expected result
to the
                                        actual result.
                                        the test cases in the list in run
in learn mode.
                                    If it is set either to test in the
test case list
                                        or, test or individual for a
test
                                        case, the test is ready to run.
                                    For a TestCase list, setting the
mode to individual,
                                        causes the TestCaseMode in the
individual test cases
                                        to define the mode for the
individual test cases."
        SYNTAX                      INTEGER { testUndefined(1),
                                        testPass (2),
                                        testFail (3),
                                        testLearn(4),
                                        testTest (5)
                                        }
TestCaseStatus ::= TEXTUAL-CONVENTION
        STATUS                      current
        DESCRIPTION                 "Test Case state"
```

-continued

```
        SYNTAX              INTEGER { notStarted(0),
                                      testUnprepared(1),
                                      testReadyToStart(2),
                                      testRunning(3),
                                      testCompleteSucessful(4),
                                      testCompleteTimeout(5),
                                      testCompleteFail(6)
                                    }
    ProgramInvocation ::= TEXTUAL-CONVENTION
        STATUS              current
        DESCRIPTION         "Program Invocation, complete
    execution path, and start parms"
        SYNTAX              OCTET STRING (SIZE(0. .255))
    PhoneNumber ::= TEXTUAL-CONVENTION
        STATUS              current
        DESCRIPTION         "AT style command string,
                            pulse dialing not supported"
        SYNTAX              OCTET STRING (SIZE(0. .32))
userTestCasesConf           OBJECT IDENTIFIER
                            ::= { userTestCases 2 }
userTestCasesGroups         OBJECT IDENTIFIER
                            ::= { userTestCasesConf 1 }
userTestCasesCompls         OBJECT IDENTIFIER
                            ::= { userTestCasesConf 2 }
userTestCasesObjs           OBJECT IDENTIFIER
                            ::= { sigGeneric 34 }
userTestCasesEvents         OBJECT IDENTIFIER
                            ::= { userTestCases 3 }
userCasesEventsV2           OBJECT IDENTIFIER
                            ::= { userTestCasesEvents 0 }
userTestCaseTable
                            OBJECT-TYPE
                            SYNTAX         SEQUENCE OF UserTestCaseEntry
                            MAX-ACCESS     not-accessible
                            STATUS         current
                            DESCRIPTION    "Test Case Table"
                            ::= { userTestCasesObjs 1}
userTestCaseEntry
                            OBJECT-TYPE
                            SYNTAX         UserTestCaseEntry
                            MAX-ACCESS     not-accessible
                            STATUS         current
                            DESCRIPTION    "A row in the simulator Test
Cases table.
                                           Row are ceated when test
cases are added."
                            INDEX          { number }
                            ::= { userTestCaseTable 1 }
UserTestCaseEntry           ::= SEQUENCE {
                                           number           Integer32,
                                           name             DisplayString,
                                           programName
ProgramInvocation,
                                           status           TestCaseStatus,
                                           mode             TestCaseMode,
                                           rowStatus        RowStatus,
                                           setup            DisplayString,
                                           testCase         DisplayString,
                                           dN               PhoneNumber,
                                           timeout          Integer32
                                         }□
number
                            OBJECT-TYPE
                            SYNTAX         Integer32(0. .32767)
                            MAX-ACCESS     read-create
                            STATUS         current
                            DESCRIPTION    "The Test Case Lists Number"
                            ::= { userTestCaseEntry 2 }
                            name
                            OBJECT-TYPE
                            SYNTAX         DisplayString(SIZE(64))
                            MAX-ACCESS     read-create
                            STATUS         current
                            DESCRIPTION    "Name of the Test Case List
Test Case"
                            ::= { userTestCaseEntry 3 }
programName
                            OBJECT-TYPE
                            SYNTAX         ProgramInvocation
```

-continued

|  |  |  |  |
|---|---|---|---|
|  | MAX-ACCESS | read-create |  |
|  | STATUS | current |  |
|  | DESCRIPTION | "Name of the Test Case List |  |
| Test Case" |  |  |  |
|  | ::= { userTestCaseEntry 4 } |  |  |
| status |  |  |  |
|  | OBJECT-TYPE |  |  |
|  | SYNTAX | TestCaseStatus |  |
|  | MAX-ACCESS | read-create |  |
|  | STATUS | current |  |
|  | DESCRIPTION | "Status of test case." |  |
|  | ::= { userTestCaseEntry 5 { |  |  |
| mode |  |  |  |
|  | OBJECT-TYPE |  |  |
|  | SYNTAX | TestCaseMode |  |
|  | MAX-ACCESS | read-create |  |
|  | STATUS | current |  |
|  | DESCRIPTION | "Mode of test case." |  |
|  | ::= { userTestCaseEntry 6 } |  |  |
| rowStatus |  |  |  |
|  | OBJECT-TYPE |  |  |
|  | SYNTAX | RowStatus |  |
|  | MAX-ACCESS | read-create |  |
|  | STATUS | current |  |
|  | DESCRIPTION | "Status of Test Case Lists |  |
| entry row" |  |  |  |
|  | ::= { userTestCaseEntry 7 } |  |  |
|  | This section of the MIB Is Test Case dependent. |  |  |
| setup |  |  |  |
|  | OBJECT-TYPE |  |  |
|  | SYNTAX | DisplayString |  |
|  | MAX-ACCESS | read-create |  |
|  | STATUS | current |  |
|  | DESCRIPTION | "IVR Response to call" |  |
|  | ::= { userTestCaseEntry 8 } |  |  |
| dN |  |  |  |
|  | OBJECT-TYPE |  |  |
|  | SYNTAX | PhoneNumber |  |
|  | MAX-ACCESS | read-create |  |
|  | STATUS | current |  |
|  | DESCRIPTION | "Phone Number to Call in |  |
| test" |  |  |  |
|  | ::= { userTestCaseEntry 9 } |  |  |
| testCase |  |  |  |
|  | OBJECT-TYPE |  |  |
|  | SYNTAX | DisplayString |  |
|  | MAX-ACCESS | read-create |  |
|  | STATUS | current |  |
|  | DESCRIPTION | "Phone Number to Call in |  |
| test" |  |  |  |
|  | ::= =5 userTestCaseEntry 10 } |  |  |
| timeout |  |  |  |
|  | OBJECT-TYPE |  |  |
|  | SYNTAX | Integer32 |  |
|  | MAX-ACCESS | read-create |  |
|  | STATUS | current |  |
|  | DESCRIPTION | "Phone Number to Call in |  |
| test" |  |  |  |
|  | ::= { userTestCaseEntry 11 } |  |  |

This section of the MIB Is Preferably Required for all test cases.

| userTestCaseGroup | OBJECT-GROUP |  |
|---|---|---|
|  | OBJECTS | { number, |
|  |  | name, |
|  |  | programName, |
|  |  | mode, |
|  |  | status, |
|  |  | rowStatus, |
|  |  | setup, |
|  |  | testCase, |
|  |  | dN, |

-continued

```
                        timeout
         STATUS         current
         DESCRIPTION    "Objects in Traffic
Driver/Checker"
                    ::= { userTestCasesGroups 1 {
userTestCaseCompliance
                        MODULE-COMPLIANCE
                        STATUS         current
                        DESCRIPTION "All test cases must have
timeout values"
                        MODULE         userTestCases
                    ::= { userTestCasesCompls 1 }
END
```

The test case MIB is added to the compliance section of the MIBs included, and to the capabilities part of the MIB having the proper file. In addition the new MIB name is added to the include file (sys-mib.inc ).

The MIB is then complied with the m2.bat file provided in the MIB subdirectory. At a DOS prompt enter the command m2 (which contains the MIB compiler command line) is entered. When the MIB complies correctly, the output of the MIB compiler (sys-mib.imf) is loaded into the Database Load menu option.

Tests of systems can be carried over into multiple levels. System-wide service assurance tests can be built using two different methods: centralized and distributed testing. Each method has its advantages and disadvantages.

In the centralized model, every test is run from a single system, the centralized test unit tests every other node within the system. This method makes test control easy as each test is scheduled from a single subsystem; it is likely the best method for small system configurations, where all the components are in a single building, or on a single LAN segment. This configuration may be sufficient for networked systems with two or three interconnected LANs.

The disadvantage of the foregoing test implementation arises from the nature of networked systems. If a link between the test system and other networked computer systems fails, it is difficult to test whether or not the other LAN segments are functioning proper, because the target system cannot be reached. The link between the test system and the other subnetworks must be repaired before useful testing can continue. This disadvantage can be reduced significantly if more than one link between the test system and the computer subnets can be made available.

Distributed testing implementations require a test system in each major area of the network. A business with several distributed offices may want to be able to test within each major city, and aggregate the reports to a centralized office for trouble ticket handling. Subnets can be tested locally, reducing the likelihood of link failure between the test system and the applications to be tested. Redundancy is also provided, because more than one test unit is resident on the network. In the unlikely event of a test system failure, another system can resume testing for the failed unit.

Each individual application on each system node is tested on a pass/fail basis. When the application fails, the test apparatus of the invention performs diagnostic tests on the node to determine the location of the failure, and whether the fault is likely to be hardware or software related. Each node which is involved in providing customer service is fault tested, on a repeating basis to ensure that customer service is being provided in a satisfactory manner.

The test equipment provides node-by-node diagnostic tests when required, to analyze a reported test failure. The node-by-node testing is performed under command of the enterprise automation system.

MIBs are addressed by way of Object Identifiers (OIDs). An example of an OID is: 1.3.6.1.4.1.2392. 2. 5. 2. 2. 1. The prefix, 1.3.6.1.4.1 refers to an SNMP MIB. The number 2392 is the test apparatus MIB enterprise number. The heart of the MIB numbering scheme is: 2. 5. 2. 2. 1.

The following Table 9 illustrates the OID table numbering. In general OIDs represent a static committed interface between MIBs users. Within the static definition of elements addressed by OIDs are dynamic tables. The dynamic tables have rows that are implementation, both for internal use by the test apparatus and the test case Components and Test Case Lists, defined above. The test apparatus makes extensive use of dynamic tables.

TABLE 9

| OID | Name | Use |
| --- | --- | --- |
| 1.3.6.1.4.1.2392.2.3.2.1 | Port Card Table | List the cards used in a Service Meter System for telephone calling out or calling in. |
| 1.3.6.1.4.1.2392.2.3.2.2 | Port Table | Contains the ports (telephone lines) on a card |
| 1.3.6.1.4.1.2392.2.5.2.1 | Node Table | Names of the Components in the system that are to be tested. The rows in the node table contain the node names.<br>The OID of the first row is:<br>1.3.6.1.4.1.2392.2.5.2.1.1 of the second:<br>1.3.6.1.4.1.2392.2.5.2.1.2 and so on sequentially. |
| 1.3.6.1.4.1.2392.2.5.2.2 | Test Case Lists Table | Table to contain the test case lists. Each list has a name and an object identifier.<br>Polling (doing an SNMP GET Request) to the OID |

TABLE 9-continued

| OID | Name | Use |
|---|---|---|
| | | 1.3.6.1.4.1.2392.2.5.2.2.x.4 the Test Case List status element. |
| 1.3.6.1.4.1.2392.2.5.2.3 | Test Case List Table | This contain the run time information (pass, fail and test result) about the test case. |
| 1.3.6.1.4.1.2392.2.99 | Test Case Manager | Enables the SNMP manager to restart and stop the Service Meter executive. This is the ONLY variable we recommend the SNMP manager sets (write to) in the service meter MIB. |
| 1.3.6.1.4.1.2392.3.31.1 | Voice Call Test Case Table | Contains the Voice Call test cases. May be modified to add additional test case parameters. |
| 1.3.6.1.4.1.2392.3.34.1 | User Test Case Table | Contains User Test cases, for test cases where a Unique MIB is not required. |
| 1.3.6.1.4.1.2392.3.37.1 | Voice Answer Test Case Table | Contains the Voice Call Answer test cases. Can be used to track call arrivals at call center agents. May be modified to add additional test case parameters. |
| 1.3.6.1.4.1.2392.3.40.1 | Data Call Answer Test Case Table | Contains the Data call answer test cases. Can be used to track screen pops at call center agents. May be modified to add additional test case parameters. |
| 1.3.6.1.4.1.2392.3.43.1 | Data Transaction Test Case Table | Contains the Data Transaction test cases. Can be used to test transactions into legacy systems. May be modified to add additional test case parameters. |
| 1.3.6.1.4.1.2392.3.46.1 | Ivr Call Flow Test Case Table | Contains the IVR Call flow test cases. Can be used with voice recognition to test IVR prompts. May be modified to add additional test case parameters. |
| 1.3.6.1.4.1.2392.3.49.1 | Ivr Port Test Case Table | Contains the IVR Port flow test cases. Can be used to monitor the state and statistics of a set of IVR ports. May be modified to add additional test case |

When the test apparatus of the invention first runs, it accesses the MIB, and performs an initialization routine which "walks" through the MIB and creates all the test cases necessary [as defined in the MIB]. The test apparatus does not run the test cases until commanded to do so; however, it is ready to run the tests due to the setup/initialization routine it performs. This process is referred to as MIB discovery.

As noted above, MIB has dynamic tables contained therein. The Object Ids of these tables row change as Components or Test Case Lists are deleted and the database expunged. When the database is expunged, and promoted from the Administration to the Executive routine, each item in the MIB must be rediscovered.

In addition, the OIDs of Components is dependent on their position in the test case list table. According to the preferred embodiment, new components and test lists are added at the end of the table.

The Component and Test Case List tables should be carefully prepared and built if automation is being utilized. The Component, Test Case List and Test Case run time OIDs are the way that automation package understands what an individual test case list is testing. These OIDs will change if there is a deletions in the MIB tables and the MIB database is expunged.

The functions of the test apparatus is operated under control of an enterprise automation package, such as HP OpenView 40. The enterprise automation system commands the test apparatus to perform one or more tests on a repeating basis. These commands, which cause the MIB to run a test case and provide a result to the automation system, are considered to "poll the MIB." The traffic driver/checker 44 advises the automation system whether the target device passed or failed the test.

The SNMP Manager polls (issues and SNMP GET request) the Test Case List state element whose OID is: 1.3.6.1.4.1.2392.2.5.2.2.x.4, where x is the number of the Test Case List, and ranges from 1 to 999. The upper limit of 999 is a traffic driver/checker 44 restriction on the maximum number of rows in a table.

Polling the Test Case list result can return any one of seven states. When the SNMP manager reads the state, two actions are taken. The first is to return the state. The second is to advance the Test Case List to its next state.

The Test Case Lists contains a memory for diagnosing failed tests. When a test fails, the failing tests' run time OID is placed in the Test List at OID 1.3.6.1.4.1.2392.2.5.2.3.x.6, where x is the number of the Test Case List.

The table row referenced by this OID contains information from the failing test (if the test is well behaved) at the OID "failed_test_case.11. This table element is a 255 byte character string. The contents of this string are test case dependent, and are mostly defined by the test case designer.

There are three test failure results generated internally by the traffic driver/checker 44. These are:

1. Test Fail: Timeout.

2. Test Fail: Simulator.

3. Test Fail: No test program assigned.

The states, the color of the state in the Program Control tree view, an explanation of the states meaning and the next action taken when the state is read is contained in the table, Table 10, below.

TABLE 10

| State | Program Control Bitmap Color | Next Action☐ |
|---|---|---|
| Not Started☐ | Black | Unprepared☐<br>All test case programs are started. They should return a "start" message to program control. When all have started then the state will change. |
| Unprepared | Blue | Trying to Start☐<br>As soon as the routine to prepare the test cases begins, the state is set to "Trying to start". |
| Trying to start | Grey | Ready to Start☐<br>Parameters are sent to the test cases. When all prarmeter are sent, a "setup" message is sent to each test case. When all test cases respond to the setup message, the state changes to Ready to Start.☐<br>This state transition is used to enable the test case to initialize themselves<br>There is no timeout period for a test case to initialize |
| Ready To Start | Yellow | Running.☐<br>As soon as the test case list (all test cases are Ready to Start) the first test case is ruin. |
| Running | Cyan | Pass, timeout or Fail.☐<br>The state of a test case when it is testing a component. |
| Pass | Green | Unprepared |
| Timeout | Red | Not Started (the test case is stopped) |
| Fail | Magenta | Unprepared |

It is possible to change (write to) the MIB with the SNMP management system, with the exception of the OID 1.3.6.1.4.1.2392.2.99, which is used to restart the Executive.

Automation packages are rule-based systems; that is, they run tests and use a specified rule to determine whether the response passes or fails to meet the criteria. The rules embody the requirements passing the test, and identify the meaning of the result received.

An example of a rule affecting the interpretation of test results is "The ABC system will be out of service for maintenance every day between midnight and 2:00 a.m." Clearly, any test which runs on this system during the period from midnight to 2:00 a.m., will fail every time the test is run. It may be decided that the way to implement this rule is not to run tests on applications dependent on the ABC system during the hours of ABC's scheduled downtime. Thus, in this case, the enterprise automation package may be defined so tests are run only during the remaining 22 hours of each day.

When a service assurance test fails a predefined number of times, the traffic driver/checker 44 uses information obtained from the test results to run a series of diagnostic tests that determine which subsystem failed. The information is passed back to the enterprise automation package. The enterprise automation package can then use the information to initiate a trouble ticket and route the ticket to the correct technical group for repair.

The following Visual Basic program is an example of a simple test case. The six events that must be consider are: Form Load, Form Terminate, OnEndTest, OnSet Parms, OnSetup and OnRunTest.

In the example shown, Form Load sets the Test Case Caption. The port number issues to distinguish one test case from another. The port number is in the 3000 range. The port number is built from adding 3000 to the unique test case value in the Test Case List MIB table (OID 1.3.6.1.4.1.2392.2.5.2.3.x), where x is the unique row value of the test case in the Test Case List table.

OnEndTest is a message sent from Program Control to the Test case. Both this event and Form Terminate mean end, free all of the resources and end. If the test case does not end after receiving an OnEndTest event, Program Control waits for a test complete event from the test case for 30 seconds. If this is not received, Program Control cancels the test case process.

The OnSetParms event occurs the same number of times there is a test case parameter in the MIB. In the preferred embodiment, there are a maximum of 16 parameters allowed for a Test Case (a Test Case Editor limitation). In the following sample the parameter strings are stored in a string array. MIB values with suffixes 8 to 16 are sent to a test case. Other MIB parameters (1 to 7) are used by the Program Control.

OID: is the unique test case number in the test case list.

Parm: is the parameter value, always a string.

ParmType: Internal for up to a 255 byte string. External is a file, whose file name is contained in Parm.

The OnSetupTest event occurs twice. This event occurs First time when all parameters have been sent to the test case. At this point the test case should set up the run time environment.

A second time of the event occurs with an internal string that contains information from previously successful test cases. This string is used to pass information between test cases in the Test Case list. It contains concatenated information from the:

TestDataType, TestData and TestResult

OnRunTest: Run the test case. There are no parameters.

OCX properties.

There are three test case properties, as discussed above.

TestDataType:
  Internal_text only.

TestData:
  A short string that contains information to be passed to subsequent test cases. The aggregate length of this string from all test cases in a test list is 255 bytes TestResult
  True if the test passed. False if the test failed.

The Program Control of the traffic driver/checker 44 can run and terminate a test case without the use of an SNMP Manager. The right mouse button click on the test list bitmap in the Program Control windows runs the test list. The right button clicked on the test case bitmap stops the test case.

The Test Case OCX provides a Writelog method. This, in conjunction with the logLevel property controls the OCX bases test case log. The OCX can log all messages between Program Control and the Test Case. The logLevel is set to all to collect all messages.

The logCount property controls how many messages are written into a log file. The logCount value default is 4096.

For example:

LogLevel=all

Call writeLog( info, "This is an information message")

Or

LogLevel=error

Call writeLog( error, "This is an error message")

The following is an example of the Visual Basic Test case.

```
Dim instring As String
    Dim tcParms(8 To 15) As String
Private Sub Form_Load( )
    instring = CStr(smTCX1.LocalPort)
    Form1.Caption = Form1.Caption + ":" + instring
End Sub
Public Sub Form_Terminate( )
    End
End Sub
Private Sub smTCX1_OnEndTest(ByVal action As
smTestCaseXControl.TxCloseAction)
    End
End Sub
Private Sub.smTCX1_OnSetParms(ByVal oid As Long,
    ByVal parm
As String, ByVal parmType As smTestCaseXControl.TxtcResultType)
        tcparms(oid) = parm
    End Sub
Private Sub smTCX1_OnSetupTest(ByVal data As String, ByVal
dataType As smTestCaseXControl.TxtcResultType)
    '(* setup test case here-all parms are in *)
End Sub
Private Sub smTCX1_OnRunTest( )
    'run Test
    smTCX1.TestDataType = internalText
    smTCX1.TestData = Form1.Caption
    smTCX1.TestResult = True
End Sub
```

In summary, the Management Information Base (MIB) is the basic building block for Enterprise Management. The MIB identifies the component applications in the system, associates each component with one or more test cases, and directs the flow of tests over the network or subnet to be tested. The MIBs are used to control the flow of testing, as well as to pass information from the SNMP agent back to the traffic driver/checker 44.

The MIB structure uses databases and lists; some lists are used as indexes; others are cross-references between the MIB and the "human names." An example is the name "TestCaseListGroup" —an ASCII string which is more meaningful to humans than "1.3.6.1.4.1.2392. 3. 4. 1. 3",the Object ID belonging to TestCaseListGroup.

While the preferred embodiment of the invention has been disclosed with reference to a specific test apparatus and methods of operation thereof, it is to be understood that many changes in detail may be made as a matter of engineering or software choices, without departing from the spirit and scope of the invention, as defined by the appended claims.

What is claimed is:

1. A method of testing transaction systems, comprising the steps of:

coupling test inputs to the transaction system, at least one said test input being of an analog type as input by a user of the transaction system;

said coupling step including coupling a plurality of different output probes to respective sub-systems of the transaction system;

receiving from one or more points of said transaction system respective responses to the test inputs, one response being an analog response;

coupling a plurality of response check points via a corresponding plurality of response lines to receive said responses;

utilizing an MIB structure to carry out the coupling and receiving steps; and utilizing enterprise automation equipment to control the MIB structure and identify a fault in the transaction system based on the responses received therefrom.

2. The method of claim 1, further including periodically monitoring the transaction system at periodic intervals during regular operation of the transaction system to verify correct operation thereof.

3. The method of claim 1, further including dialing a telephone number of the transaction system, and receiving a voice response that assures correct operation.

4. The method of claim 1, further including using a tester having response inputs and test signal outputs, and further including coupling commands between the enterprise automation equipment and said tester using an Internet connection.

5. The method of claim 1, further including using boundary probes coupled to the transaction system to determine which sub-system of the transaction system has failed.

* * * * *